United States Patent [19]

Strommer

[11] 3,863,019

[45] Jan. 28, 1975

[54] PROCESS FOR TEXTURING A PROTEIN SLURRY

[75] Inventor: Palmer K. Strommer, Osseo, Minn.

[73] Assignee: General Mills, Inc., Minneapolis, Minn.

[22] Filed: Oct. 15, 1973

[21] Appl. No.: 406,744

Related U.S. Application Data

[63] Continuation-in-part of Ser. No. 165,596, July 23, 1971, abandoned.

[52] U.S. Cl. ............................................. 426/511
[51] Int. Cl. ............................................. A23j 3/00
[58] Field of Search ............................................. 426/511

[56] References Cited
UNITED STATES PATENTS 3,303,182   2/1967   Sakai et al. .................. 260/123.5
3,642,490   2/1972   Hawley et al. ................. 426/511 X
3,662,671   5/1972   Frederiksen et al. ............ 426/205
3,662,672   5/1972   Hoer ........................... 426/205
3,730,729   5/1973   Strommer ..................... 426/511 X
3,754,926   8/1973   Strommer et al. ............... 426/511

Primary Examiner—James R. Hoffman
Attorney, Agent, or Firm—A. A. Juettner; N. P. Friederichs

[57] ABSTRACT

A method is disclosed for producing a bland textured protein product. The method includes the steps of mixing untextured protein material and water to form an untextured protein slurry which is fed into a flowing stream of hot, pressurized steam and carried to a zone of lower pressure. The slurry is partially dehydrated upon entering the zone of lower pressure and is texturized.

10 Claims, 1 Drawing Figure

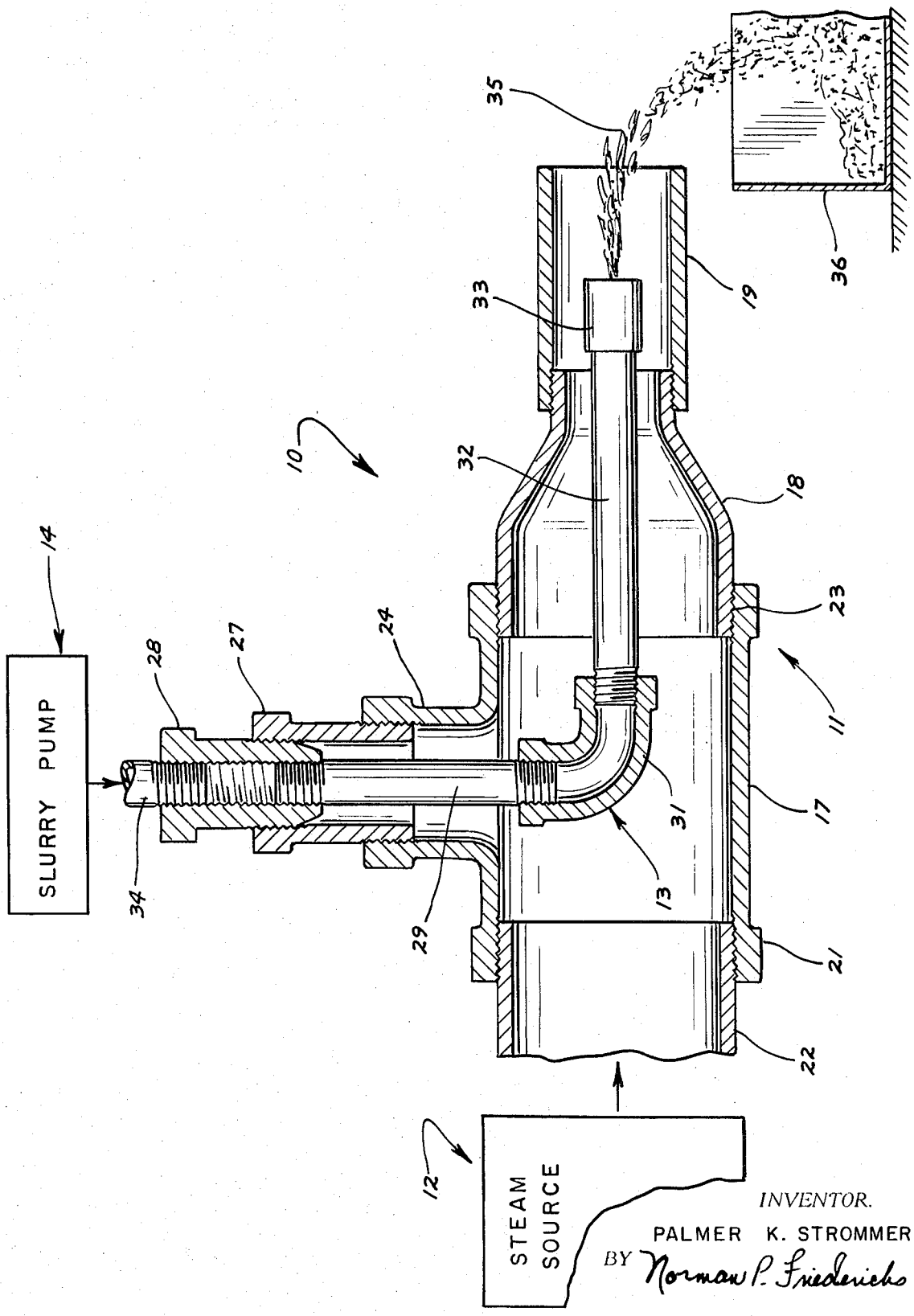

PROCESS FOR TEXTURING A PROTEIN SLURRY

This is a continuation-in-part of patent application, Ser. No. 165,596 filed July 23, 1971 and now abandoned.

The present invention relates to a method for treating food products and more particularly to a method for producing a bland textured protein product from a protein slurry.

In recent years substantial effort has been directed toward treating untextured protein materials including vegetable protein material so as to provide such materials with texture and other characteristics commonly found in animal meat products. The vegetable protein materials are primarily soybean meal and flour; however, various other vegetable protein meals and flours may be used, typically, such materials as peanut, cottonseed, sesame seed and brewer flakes. Other protein materials that have been used include casein. It is generally preferred to use protein concentrates of such materials including at least about 50 percent protein by weight.

Various types of methods and apparatus have been used in the past to texturize the vegetable protein material. For example, solubilized soy protein has been extruded into an acid bath thereby forming texturized fibers. Recently it was discovered that particulate untextured protein material may be texturized by propelling masses of closely spaced particulate material in a confined path through an area having an elevated gaseous pressure and then removing the masses to a zone of lower pressure.

The present invention relates to a continuous texturizing process in which an untextured protein slurry is fed into a moving stream of hot, pressurized steam. The steam carries the protein material to a zone of lower pressure such as atmospheric pressure. The protein material so treated is found to be textured and expanded upon entering the zone of lower pressure. The term "texturizing" as used herein will refer to the process of changing the discrete portions or particles of protein into chunks having continuous phase protein and expanding or puffing the protein material to produce a cellular structure. Such material has a chewiness or bite characteristic similar to meat.

Apparatus suitable for carrying out the present invention is shown in the drawing.

The apparatus 10 which may be used for carrying out the present invention includes a texturizing tube 11, a steam source 12, a slurry feeding tube 13 and a slurry pump 14. The texturizing tube 11 may be constructed from steel pipe and in the embodiment shown in the drawing includes a T-fitting 17, a reducing fitting 18 and a pipe 19. A steam line 22 connects the texturizing tube 11 with the steam source 12. The T-fitting 17 has a first end 21 which is threadedly engaged with steam line 22 and a second end 23 which is threadedly engaged with the reducer 18 which in turn is threadedly engaged with pipe 19. The T-fitting 17 has a side leg 24 for purposes hereinafter set forth.

The steam source 12 (shown schematically) may be a boiler that is capable of delivering a steam pressure to tube 11 sufficient for texturization. Alternatively, any apparatus may be used which is suitable for providing hot pressurized gaseous fluid including steam. The steam in tube 11 is preferably super heated and may have any temperature and pressure that is sufficient to texturize the protein material. For example, pressures as high as 140 p.s.i.g. and higher have been used. On the other hand, steam pressures as low as 25 p.s.i.g. may be used in texturizing the protein material. The preferred pressure conditions of the present invention are at least 55 p.s.i.g., typically 80 to 140 p.s.i.g. It has been found that an increase in pressure generally results in an increase in blandness, texturization and/or expansion. The temperature in tube 11 during steam treatment will generally be at least 250°F. or higher and may be 500°F.

The slurry feeding tube 13 includes a pair of bushings 27 and 28, a nipple 29, an elbow fitting 31, a nipple 32 and a nozzle 33. The bushings 27 and 28 are threaded both internally and externally. The bushing 27 is threadedly engaged in side leg 24 of T-fitting 17. The bushing 28 is welded to one end of nipple 29 and is threadedly engaged in bushing 27. The elbow fitting 31 connects nipple 29 with nipple 32. The nozzle 33 is threadedly engaged with nipple 32. The nozzle 33 lies within the pipe 19 and serves as a restriction to the steam flow. If a substantially dry product with a tough texture is desired, the nozzle should provide a spray of finely divided particles. On the other hand, if a wetter and softer texture is desired, the spray may be of larger particles or may be a steady stream. The slurry pump 14 is connected to the slurry feeding tube 13 by pipe 34. The slurry pump 14 may be any pump that is capable of pumping a slurry containing at least about 70 percent water and 30 percent or less protein material. The terms "percent," "parts," and the like, as used herein, will mean by weight unless otherwise stated.

The protein material texturized in the present invention may be protein flour, meal or concentrate, for example, of soybean, peanut, cottonseed, safflower and/or sesame seed. The protein content of the protein material should be at least 30 percent (dry weight basis) and preferably is about 50 to 75 percent. Water is added to the protein material in an amount sufficient to form a pumpable slurry. Typically, the total moisture content of the slurry will be at least about 70 percent and preferably about 75 to 85 percent by weight of the slurry. The protein material and the water may be uniformly mixed such as in a Hobart mixer and then pumped to the texturizing apparatus with any type of pump suitable for handling slurries. (The pump used in the following examples was a Graco Model 83–9675 produced by the Gray Company of Minneapolis).

Steam is fed to the tube 11 in an amount sufficient to result in texturization of the protein material. In other words, the steam is provided in an amount sufficient to (a) make the protein material non-dispersible, (b) change the discrete portions or particles of protein into chunks having a continuous phase of protein and (c) flash off a significant amount of water from the slurry thereby producing a cellular structure in the chunks. The steam provides sufficient heat energy to reduce the water content of the slurry by at least 5 percent (based on the total weight of the slurry), preferably at least about 50 percent and more preferably at least about 70 percent. The steam to slurry ratio is preferably between 1 and 10 parts steam per part of slurry. The steam is provided in an amount sufficient to result in heat transfer from the steam to the slurry of between about 100 and 1,250 BTU (British thermal unit) per pound of slurry.

The texturizing apparatus of the present invention may be placed in operation by first starting the flow thereto of steam from source 12 and then starting the slurry from pump 14. The protein slurry passes through the feeding tube 13 and is sprayed into the steam stream which is passing through the texturizing tube 11. The protein material then passes from pipe 19 of texturizing tube 11 into the atmosphere and a substantial amount of moisture is flashed from the protein material. The protein material is collected in container 36. The moisture content of the resulting texturized protein material will generally be at least 5 percent.

The present invention provides textured protein having acceptable water holding capacity and acceptable texture. The water holding capacity of the textured protein is desirably in the range of 2 to 3 for most uses such as meat extending uses. The water holding capacity of the protein may be less in other uses, such as 1.5 in simulated beef chunks. The term "water holding capacity" as used herein refers to the total amount of water the protein material is able to hold and is determined by soaking the texturized protein in an excess of water for 20 minutes and then draining for 5 minutes. The water holding capacity is equal to the wet weight minus the dry weight and that value divided by the dry weight. Texture of the protein material may be measured in shear press values. Shear press values for texturized protein of the present invention will generally be in the range of 300 to 1,500 pounds as determined by the following procedure. Sample is prepared for measurement by weighing out 75 grams (dry weight basis) of texturized protein material. The sample is placed in an excess of cold water and soaked at about 40°F. for 1.5 hours. The sample is drained for 5 minutes and divided into three equal parts by weight. The three parts are wrapped in plastic and allowed to stand at room temperature for 20 minutes. Each of the parts are tested in the Allo-Kramer Shear Press (Ser. No. 1042, Model No-5-2H) using a 10-bladed head according to conventional techniques using a 2,500 pound ring and the three values are added together.

Protein which has been texturized according to the present invention is quite different from protein which has been texturized according to previously known processes. For example, the texturized protein has a taste which is surprisingly mild and bland. The processed protein material leaves the apparatus as discrete chunks and thus is ideal for preparing simulated chunks of beef. The product has a puffed-like structure with smaller voids than that of previously known texturized protein. Also, the voids are of random orientation. The texturized protein material appears to be layered.

The textured protein of the present invention may be used for the same purposes and in substantially the same manner as previously known types of texturized protein. The protein material, as it comes from the texturizing apparatus, may be impregnated with conventional meat analog serum typically including binder, flavoring and water, thereby producing a simulated beef chunk or a simulated chicken chunk. The protein material may be ground, such as with a Comitrol Cutter, hydrated and mixed with ground beef or pork sausage, thus acting as a meat extender. Alternatively, the texturized material may be finely chopped and impregnated with a conventional meat analog serum, thereby producing a simulated ground beef or simulated ground pork. For example, simulated ground beef may be prepared by mixing, by weight, about 3.5 parts beef tallow, 4.3 parts corn flour, 1.7 parts egg albumin, 1.2 parts brown sugar, 1.2 parts onion powder, 1.0 parts salt, 50 parts water, 24 parts texturized protein material, beef flavoring and sufficient caramel coloring to obtain the desired cooked hamburger color. The mixture may be heated to set the egg albumin.

EXAMPLE I

Texturized protein material was prepared according to the present invention from a dry blended mixture containing 70 parts soybean concentrate (Textrol[1]) and 30 parts soybean isolate (Promine R[2]). In this instance the term "parts" refers to parts by weight, on an as is moisture basis, the moisture content normally being about 6 percent. Sufficient water was added to the protein material to raise the total moisture content to 80 percent by weight. The protein material and water were intimately mixed and then pumped to the texturizing apparatus under a pressure of 170 p.s.i.g. The slurry was sprayed into the steam stream using an atomizing nozzle. The steam pressure in the stream was 95 p.s.i.g. and the temperature was 485°F. The product was texturized and had a moisture content of 8 percent by weight. The product was suitable for preparing simulated ground beef. The product had a water-holding capacity of 2.4 and a shear press of 700 pounds.

[1]Textrol is a processed soy protein material having a minimum protein content of 63.5 percent and produced by Central Soya Co., Inc.
[2]Promine R is an isolated soy protein material having a protein content of about 95 percent and produced by Central Soya Co., Inc.

EXAMPLE II

Texturized protein material was prepared according to the present invention from soybean concentrate (Textrol). Sufficient water was mixed with the concentrate to raise the total moisture content to 80 percent by weight. The slurry was pumped to the texturizing apparatus at a pressure of 200 p.s.i.g. and at room temperature. The slurry was sprayed into the flowing stream of steam using an atomizing nozzle thereby intimately commingling the slurry and steam. The steam pressure in the texturizing tube was 120 p.s.i.g. and the steam temperature was 515°F. The product was texturized and had a moisture content of 16 percent by weight. The product had a water-holding capacity of 2.8 and a shear press value of 675 pounds.

EXAMPLE III

Texturized protein material was prepared from a dry blended mixture containing 70 parts soybean concentrate (Textrol) and 30 parts soybean isolate (Promine R). Sufficient water was added to raise the total moisture content to 75 percent by weight. The slurry was pumped to the texturizing apparatus at a pressure of 210 p.s.i.g. The steam temperature was 500°F. and the steam pressure was 130 p.s.i.g. An atomizing nozzle was not used. Instead the slurry entered the stream of flowing steam as a steady stream having about a ½ inch diameter. The product was texturized and was a coagulated, spongy material that resembled scrambled eggs in color, consistency and texture. The water content of the product was 72 percent, by weight.

EXAMPLE IV

Texturized protein material was prepared according to the present invention. The protein material was Nutrisoy which is defatted low heat soy flour having a protein content of about 50 percent by weight. A slurry was prepared consisting of 22.5 percent Nutrisoy and 77.5 percent water, by weight. The slurry was pumped into a flowing stream of steam. The steam was at a temperature of 500°F. and was under a pressure of 140 p.s.i.g. The product was texturized chunks of protein material resembling the dark meat of chicken.

The embodiments of the invention in which an exclusive property or privilege is claimed are defined as follows:

1. A method for texturizing protein material comprising:
   mixing untextured protein material and water to form a slurry, said protein material containing at least 30 percent protein and comprising discrete particles of protein, said slurry containing at least about 70 percent water;
   injecting the slurry into a steam flow in a confined path, said steam flow having a temperature of at least 250°F. and a pressure of at least 25 p.s.i.g., said temperature and pressure being sufficient to texturize said protein, said steam flow carrying said protein material through said confined path; and
   releasing said protein material and said steam into a zone having a lower pressure;
   thereby making said protein material non-dispersible, changing the discrete particles of protein into chunks having a continuous phase of protein and flashing off water from said slurry to reduce the water content of said slurry by at least 5 percent, based on the total weight of the slurry, producing a cellular structure in said chunks.

2. The method of claim 1 wherein said water content is reduced at least about 50 percent.

3. The method of claim 1 wherein said water content is reduced at least about 70 percent and wherein the moisture content of the resultant textured protein material is at least about 5 percent.

4. A method for texturizing protein material comprising: mixing water and protein material having a protein content of at least 30 percent to form a slurry, said slurry having a moisture content of about 70 to 85 percent, commingling a stream of said slurry and a stream of pressurized, superheated steam, said steam being at a temperature of at least 250°F. and a pressure of at least 25 p.s.i.g., said steam providing heat transfer to said slurry of about 100 to 1,250 BTU per pound of slurry, and releasing said commingled streams to a zone of lower pressure thereby texturizing said protein material.

5. The method of claim 4 wherein said steam pressure is between about 80 and 140 p.s.i.g.

6. The method of claim 4 wherein said protein content is at least about 50 percent.

7. The method of claim 6 wherein said steam pressure is about 140 p.s.i.g.

8. A method for texturizing protein material comprising:
   mixing untextured protein material and water to form an untextured protein slurry, said protein material being capable of texturization and having a protein content of at least 30 percent dry weight basis, said slurry including from 70 to 85 percent total moisture by weight;
   feeding said slurry to a stream of steam in a confined cylinder means, said slurry and said steam being intimately commingled, said steam having a pressure of at least 25 p.s.i.g. and a temperature of at least 250°F., said steam being present in a weight ratio of between about 1 and 10 parts steam per part of slurry;
   removing said slurry to a zone of lower pressure thereby flashing off water and texturizing said protein material.

9. The method of claim 8 wherein said water is flashed off to reduce the moisture content at least about 5 percent based on the total weight of the slurry.

10. The method of claim 8 wherein said water is flashed off to reduce the moisture content at least about 50 percent based on the total weight of the slurry and wherein the moisture content of said textured protein material is at least about 5 percent.

* * * * *